United States Patent
Chen

(10) Patent No.: US 8,950,912 B2
(45) Date of Patent: Feb. 10, 2015

(54) LOW AND HIGH BEAM HEADLAMP

(71) Applicant: Federal-Mogul Corporation, Southfield, MI (US)

(72) Inventor: Xiaolu Chen, Sailine, MI (US)

(73) Assignee: Federal-Mogul Corporation, Southfield, MI (US)

( * ) Notice: Subject to any disclaimer, the term of this patent is extended or adjusted under 35 U.S.C. 154(b) by 121 days.

(21) Appl. No.: 13/648,541

(22) Filed: Oct. 10, 2012

(65) Prior Publication Data

US 2014/0098517 A1    Apr. 10, 2014

(51) Int. Cl.
| F21V 13/00 | (2006.01) |
| F21V 14/00 | (2006.01) |
| F21V 14/02 | (2006.01) |
| B60Q 1/04 | (2006.01) |
| F21S 8/10 | (2006.01) |

(52) U.S. Cl.
CPC ......... *F21S 48/1747* (2013.01); *F21S 48/1159* (2013.01); *F21S 48/137* (2013.01); *F21S 48/1104* (2013.01); *F21S 48/1305* (2013.01)
USPC ........... 362/464; 362/543; 362/545; 362/516; 362/37

(58) Field of Classification Search
USPC .......................................... 362/545, 516–518
See application file for complete search history.

(56) References Cited

U.S. PATENT DOCUMENTS

| 3,908,144 | A | 9/1975 | Rudd |
| 7,410,282 | B2 | 8/2008 | Eichelberger et al. |
| 7,775,699 | B2 | 8/2010 | Fallahi et al. |
| 2007/0279924 | A1 | 12/2007 | Yagi |
| 2008/0025037 | A1 | 1/2008 | Chinniah et al. |
| 2009/0073706 | A1 | 3/2009 | Tatara et al. |
| 2010/0046243 | A1 | 2/2010 | Yatsuda |
| 2010/0109531 | A1 | 5/2010 | Helms et al. |
| 2010/0117538 | A1 | 5/2010 | Fujino |
| 2010/0118558 | A1 | 5/2010 | Tsukamoto et al. |
| 2011/0032720 | A1 | 2/2011 | Chen et al. |
| 2011/0122637 | A1 | 5/2011 | Futami |
| 2011/0170310 | A1* | 7/2011 | Haenen et al. ............ 362/235 |
| 2013/0327966 | A1* | 12/2013 | Fidler et al. .............. 362/235 |

FOREIGN PATENT DOCUMENTS

WO    WO2012113883 A2    8/2012

OTHER PUBLICATIONS

International Search Report for application No. PCT/US2013/063252, dated Jan. 23, 2014, 3 pages.
Written Opinion for application No. PCT/US2013/063252, dated Jan. 23, 2014, 8 pages.

* cited by examiner

*Primary Examiner* — Mariceli Santiago
(74) *Attorney, Agent, or Firm* — Reising Ethington P.C.

(57) ABSTRACT

A vehicle headlamp system having a headlamp module and a processor. The headlamp module may include a light source and a reflector. The light source may include a plurality of light emitters which are individually controllable by the processor. The reflector may include a plurality of facets for reflecting the light received from the light source. The headlamp module is capable of switching between high and low beam light without mechanically movable components.

17 Claims, 4 Drawing Sheets

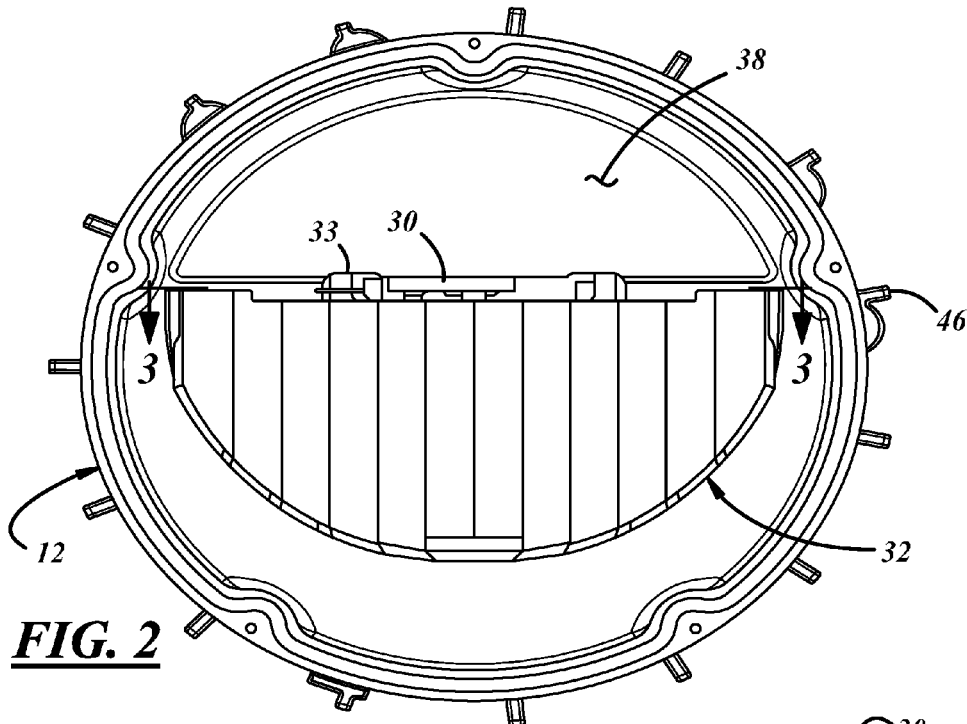
FIG. 2
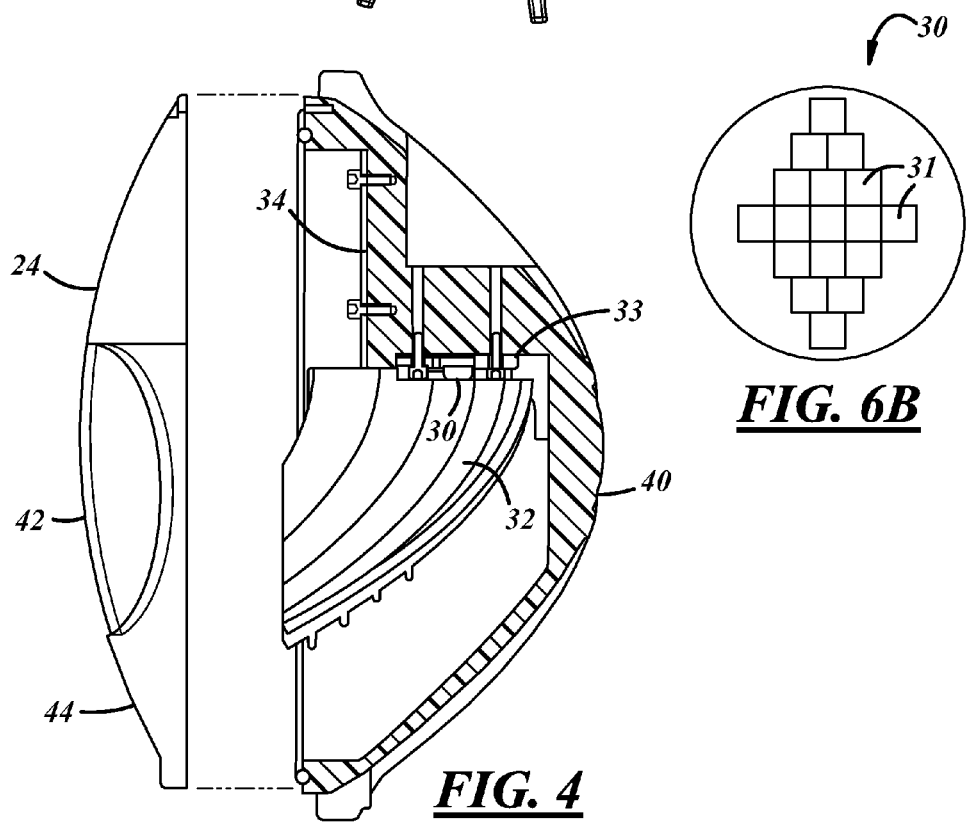
FIG. 4
FIG. 6B

LOW AND HIGH BEAM HEADLAMP

TECHNICAL FIELD

This invention generally relates to vehicle headlamps and, in particular, headlamps providing high beams and low beams.

BACKGROUND

An automotive headlamp may be attached to the front of a vehicle to illuminate the road ahead which may be especially helpful during periods of low visibility. A headlamp is a device for producing a vehicle headlight (or headlight pattern) or beam of generally directed light. Generally, low beams may have lower intensity light than high beams. In addition, high beams may be directed farther down the road and at a wider angle than low beams.

Headlight patterns and headlamp designs may differ from vehicle to vehicle. The beam or emitted light of a headlamp may vary in color or intensity. In fact, the low and high beams on a vehicle may vary in color or intensity. The shape and size of the headlamps may also vary.

SUMMARY

According to one embodiment, there is provided a vehicle headlamp module having a light source, a reflector, and a processor. The light source may be located within an interior space of a housing; it may include a plurality of light emitters which may be actuated ON or OFF. The reflector may have a plurality of facets and be located within the interior space of the housing being coupled thereto. The reflector may be positioned to receive light from the light source and directionally control the light. The processor may operate in a first mode to actuate a first set of one or more of the plurality of light emitters, the light emitter(s) of the first set being positioned relative to the facets of the reflector so as to provide a first beam pattern. And the processor may operate in a second mode to actuate a second set of one or more of the plurality of light emitters, the light emitter(s) of the second set being positioned relative to the facets of the reflector so as to provide a second beam pattern.

According to another embodiment, there is provided a vehicle headlamp system having a headlamp module and a processor. The headlamp may include a light source and a reflector. The light source may be located within an interior space of a housing, and the light source may have a plurality of light emitters which may be actuated ON or OFF. The reflector may have a plurality of facets located within the interior space of the housing and may be coupled thereto. The reflector may be positioned to receive light from the light source and directionally control the light. The processor may be responsive to user input. And the processor may operate in a first mode to actuate a first set of one or more of the plurality of light emitters, the light emitter(s) of the first set being positioned relative to the facets of the reflector so as to provide a first beam pattern. And the processor may operate in a second mode to actuate a second set of one or more of the plurality of light emitters, the light emitter(s) of the second set being positioned relative to the facets of the reflector so as to provide a second beam pattern.

According to another embodiment, there is provided a method of switching between a low beam and a high beam of a vehicle headlamp module without mechanically movable components. The steps of the method include: providing a predetermined amount of power to a first set of one or more of the plurality of light emitters in a light source, wherein the light source is located in a vehicle headlamp module; receiving a command to switch between the low beam and the high beam at a processor, wherein the processor is electrically coupled to the light source; and then providing a predetermined amount of power to a second set of one or more of the plurality of light emitters in the light source. The vehicle headlamp may include: a housing; the light source, wherein the light source is fixedly mounted within an interior space of the housing; and a reflector having a plurality of facets, wherein the reflector is fixedly mounted within an interior space of the housing, and wherein the reflector is oriented to receive light from the light source.

BRIEF DESCRIPTION OF THE DRAWINGS

Preferred exemplary embodiments of the invention will hereinafter be described in conjunction with the appended drawings, wherein like designations denote like elements, and wherein:

FIG. 2 is a front view of the vehicle headlamp shown in FIG. 1;

FIG. 4 is a cross-sectional view of the vehicle headlamp in FIG. 1 along section lines 4-4;

FIG. 6B is a perspective view of a multi-chip LED of the vehicle headlamp shown in FIG. 1 having another exemplary LED pattern;

DETAILED DESCRIPTION OF THE PREFERRED EMBODIMENTS

Figure 1:
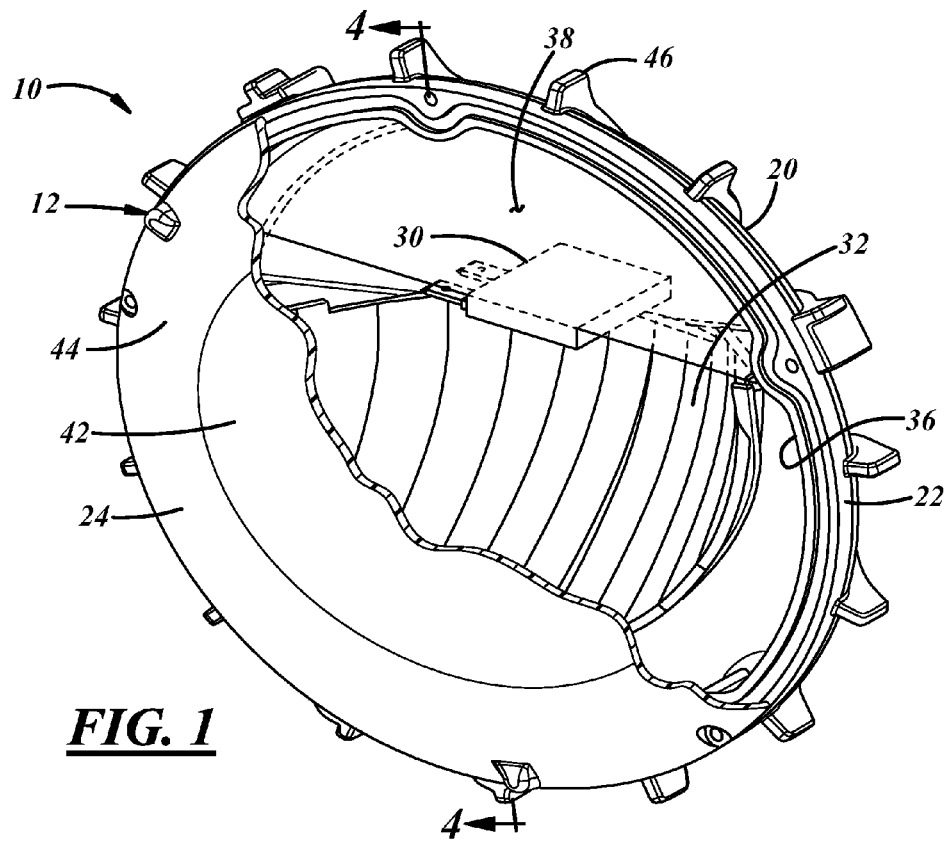
FIG. 1 is a perspective view of a vehicle headlamp.
Figure 3:
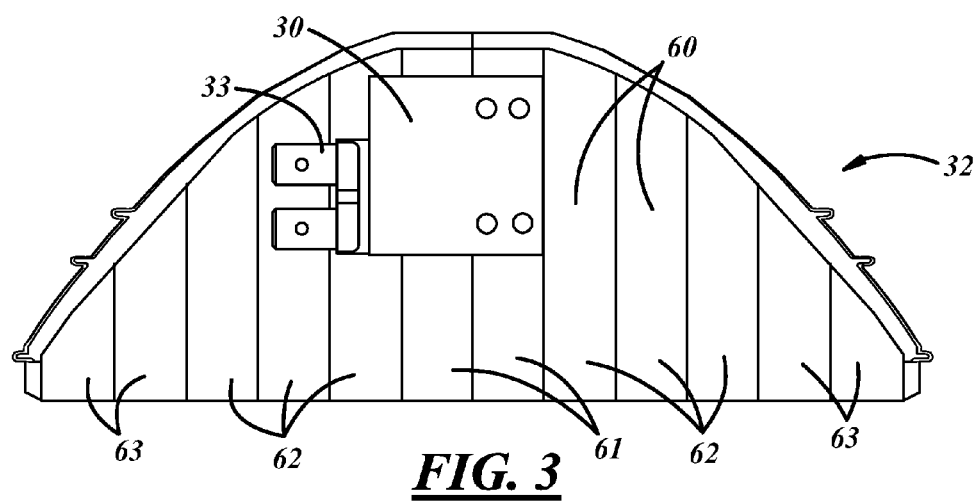
FIG. 3 is a cross-sectional view of the vehicle headlamp in FIG. 1 along section lines 3-3.
Figure 5:
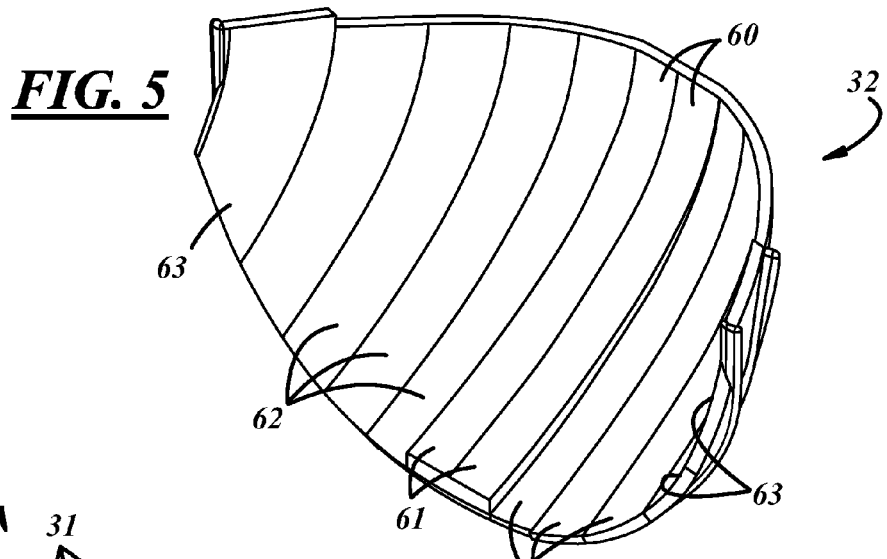
FIG. 5 is a perspective view of a reflector of the vehicle headlamp shown in FIG. 1.

The headlamp system described herein may be used in a variety of vehicles and is especially adapted to vehicles employing or using high and low beam headlamps. The term vehicle, as used herein, should be construed broadly and may include motor vehicles, all-terrain or off-road vehicles, motorcycles, etc. While the headlamp system is described with respect to a vehicle, other embodiments and applications are also possible.

Referring to FIGS. 1-5, there is shown one embodiment of a headlamp system 10 that may be used to illuminate a region in front of a vehicle. The headlamp system 10 may include a headlamp module 12 and a processor 34. The headlamp module 12 may include a housing 20 for carrying or fixedly mounting various components such as a light source 30 and a reflector 32. In addition, the housing may have a coverplate 22 which includes a window or window element 24 enclosing the components and protecting them from the environment while also permitting light from the light source 30 to be transmitted therethrough. As will be described herein, one aspect of the headlamp system 10 may include operability of high and low light beams without mechanically moving components.

Turning first to the housing 20 and the coverplate 22 of the headlamp module 12, the housing 20 may be a generally bowl- or dish-shaped member having an inner surface 36 defined by a cavity or interior space 38 which is generally concave and an outer surface 40 which is generally convex. The cavity 38 may include appurtenances and various features for fixedly supporting or carrying components such as the light source, the reflector, and the processor. The outer surface 40 may also have appurtenances and various features for mounting the headlamp module 12 to the vehicle and may have an electrical interface for coupling power and/or signals between the vehicle and headlamp module 12. Various implementations for all such appurtenances and features for mechanically or electrically coupling the headlamp module to the vehicle or the components to the housing, etc. are known or will be apparent to those skilled in the art. In addition, the shape of the cavity 38 and outer surface 40 are exemplary; other shapes are also possible.

The coverplate 22 may be an annular member and be sized to enclose the cavity 38. The coverplate may fixedly carry the window 24 so that the window and housing when assembled may collectively create a seal (e.g., protecting the interior components of the headlamp module from environmental elements such as water and dust). As shown, the window 24 may have a circular or oval circumference (and circumferential shapes are possible); in addition, the window may be flat, dish-shaped, or any other suitable shape. It may include a transparent region 42 located generally in the center of the window 24 for transmitting light therethrough from the light source 30 without appreciable scattering. The window 24 may also optionally include a translucent region 44, e.g., circumferentially surrounding the transparent region 42. The translucent region 44 may purposely diffuse the light as it is transmitted therethrough. Skilled artisans will appreciate various window configurations having transparent and translucent regions 42, 44. However, as defined herein, the window is not a lens; i.e., the window 24 does not substantially refract light passing therethrough into a different pattern than the impinging light (e.g., it does not significantly converge or diverge light rays or any part of the beam transmitting therethrough).

The housing 20 and coverplate 22 may be manufactured from aluminum or other suitable materials, as will be appreciated by those skilled in the art. They may have fins 46 which may operate as heat sinks dissipating heat generated within the headlamp module 12; e.g., by the light source. The window 24 may be glass or any other suitable material(s).

Now turning to the light source 30 located in an upper region 48 of the housing cavity 38 and is fixed carried within the cavity by a bracket 33. In the illustrated implementation, the light source 30 is located at or near the focal point of the reflector 32; however, this is not necessary. The light source 30 may be any device for providing light, including light visible to the human eye or otherwise. Furthermore, the light source 30 may include light generated or created using varying technologies. For example, the light source 30 may utilize incandescent, fluorescent, halogen, light-emitting diode (LED), high-intensity discharge (HID), or any other suitable technology. In one implementation, the light source 30 may include one or more light emitters 31. In addition, in at least one embodiment, the light source 30 is lens-less (i.e., it does not have a lens), and no light emitted from the light source 30 passes through a lens anywhere within the housing 20.

Figure 6A:
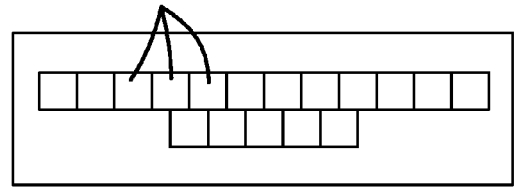
FIG. 6A is a perspective view of a multi-chip LED of the vehicle headlamp shown in FIG. 1 having an exemplary LED pattern.

In the embodiment shown in FIGS. 1-5, the light source 30 may be a multi-chip LED and the light emitters 31 may be the individual LEDs on the multi-chip. The multi-chip is oriented within the cavity 38 so that the light is directed downwards onto the reflector 32. As defined herein, a multi-chip LED may include, for example, a plurality of LEDs electrically coupled on a common substrate member. One example of a substrate includes silicon (Si); however, the composition of the substrate may vary, as will be appreciated by skilled artisans. The plurality of LEDs may be arranged as one or more arrays, one or more matrices, or any other arrangement including irregular, scattered, or unsystematic patterns. For example, the multi-chip LED shown in FIG. 6A includes two arrays arranged to be adjacent to one another and centered on a two-dimensional (2-D) substrate—one array of LEDs is a 12×1 array and the other array is a 5×1 array. In this illustrated arrangement, the two arrays are centered on the substrate (however this is not necessary).

Figure 6C:
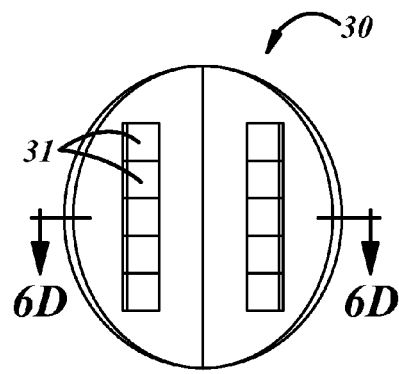
FIG. 6C is a perspective view of a three-dimensional multi-chip LED of the vehicle headlamp shown in FIG. 1.
Figure 6D:
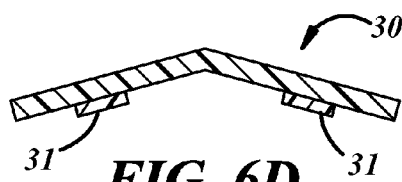
FIG. 6D is a cross-sectional view of FIG. 6C.

Examples of other arrays or arrangements include LEDs arranged in various shapes such as circular, triangular, hexagonal, square, rhomboid, diamond, other quadrilateral arrangements, and three-dimensional (3-D) arrangements or configurations. One such example is shown in FIG. 6B, illustrating a diamond-shaped arrangement (e.g., a series of single row arrays, adjacent one another, and on a single-chip—e.g., a 1×1 array, a 2×1 array, a 5×1 array, a 2×1 array, and a 1×1 array). Other embodiments of the light source 30 may also be possible—e.g., using arrangements of single-chip LEDs in either 2-D or 3-D configurations. A single-chip LED may include one LED on or embedded in a single substrate member. Therefore, the light source 30 may include arranging single-chip LEDs in any aforementioned arrangement, pattern, disarray, etc. A 3-D arrangement may include arrangements with one or more multi-chip LEDs and/or one or more single-chip LEDs. For example, one multi-chip LED implementation may include two nonadjacent single-row arrays (e.g., a first 5×1 array and a second 5×1 array) on the same or common substrate. When installed or assembled within the housing 20, the substrate may be bendable or foldable in such a manner as to create two distinct or separate planes (e.g., a V-shaped chip), such that one plane contains the first array and the other plane contains the second array (FIGS. 6C-6D).

In all implementations, the light from the multi-chip LED may be either directly or indirectly aimed toward the reflector 32. Directly aimed light may include light or light rays which arrive at the reflector 32 without reflection from any other object (e.g., objects or components within the interior of the lamp). And indirect light includes any light or light rays arriving at the reflector following such a reflection.

It should be appreciated that a single light emitter may emit light (or light rays) in multiple directions. For example, a single light emitter such as a two-dimensional LED (or LED chip) may emit may emit light or light rays semi-hemispherically.

The reflector 32 is positioned below the light source 30 in the lower region 50 of the cavity 38 in order to receive light therefrom. The received light is then redirected through the window 24—e.g., to project towards an area in front the vehicle. The shape of the reflector 32 may have an inside surface 36 and an outside surface, the inside surface defining a hollow-region (e.g., a concave surface) and the outside surface being generally dome-like (e.g., a convex surface). In the illustrated example, the reflector may be generally, partially dome-like (e.g., resembling a partial elliptic paraboloid). Regardless of the shape of the reflector, the reflector may have a plurality of facets 60 on the inside surface. The facets 60 may be free-formed, flat, and/or curved (e.g., concave or convex) members. In some instances, a single facet may have a region that is free-formed and/or a region that is flat and/or a region that is curved (e.g., any combination thereof). In some embodiments, the facets (or at least the inwardly facing surfaces thereon) may be at least approximated or otherwise defined by an algebraic equation. For example, the shape or inwardly facing surfaces of the facets may be represented by one or more fifth-degree algebraic equations (of course, other equations are also possible of any degree).

The reflector 32 and/or the facets 60 may be made of metal, plastic, or any other suitable material. The facets may or may not be coated. In at least one exemplary embodiment, the outer surface of the facets (or, e.g., the coating(s)) have a high reflectivity (e.g., a reflectivity of 80% or more). Non-limiting examples of the facets and/or the coatings thereon include aluminum and silver; other reflective materials which may be used will be appreciated by skilled artisans.

In the embodiment shown in FIGS. 1-5, the reflector is shown having twelve facets 60; however, the number of facets may vary. As best shown in FIG. 2, the centermost facets 61 may be shaped and sized to contribute to an overall beam pattern while the outermost facets 63, those farthest from the centermost facets (i.e., to the right and left), may direct light primarily to a central region of the beam pattern, creating a beam hot spot (i.e., the region in a beam pattern having the highest intensity or concentration of light received from the light emitters 31). The middle facets 62, those between the centermost and outermost facets 61, 63, may contribute to the middle of the beam pattern.

Thus, beam patterns may be defined as a measurement of the intensity of the light or light rays emitted from the headlamp module at a predetermined distance on a target normal to and axially aligned with the center of the beam's origin. Thus, in some implementations, a shift in the beam's hot spot may be associated with a shift from a low to a high beam (or vice-versa).

The headlamp system 10 also includes a processor 34. The processor may be located in any suitable location in the vehicle. However, in at least one embodiment, the headlamp module 12 includes the processor 34. For example, the processor may be located in the housing 20 in the upper region of the cavity, as shown, or elsewhere so as to not interfere with the light being directed outwardly of the headlamp module. The processor 34 may be operable to individually actuate the light emitters 31 (or LEDs) in the multi-chip LED—i.e., turn ON or OFF the LEDs individually or maybe wired to turn on groupings, groups, or sets of the light emitters 31 at a time. By actuating different sets of LEDs, the processor 34 may generate or create a high beam (or high beam pattern) and a low beam (or low beam pattern). The processor 34 may be configured to execute control logic that provides the functionality for creating different beam patterns by activating one set of the light emitters versus another set (each set may contain one or more of the light emitters 31). The processors 34 may be implemented by one or more processing units, controllers, microprocessors, micro-controllers, discrete logic circuit(s) having logic gates for implementing logic functions on data signals, application specific integrated circuits (ASIC) with suitable logic gates, complex programmable logic devices (CPLD), programmable or field-programmable gate arrays (PGA/FPGA), and/or the like.

The processor 34 may also include a power management device (PMD) such as an LED driver. The PMD may control the voltage and/or current to the individual LEDs. In some embodiments, this control may include pulse width modulation (PWM) of the current at some or all of the light emitters 31 on the multi-chip LED. It should be appreciated that PMDs other than LED drivers also may be used and that operation and/or control of such devices is known by skilled artisans.

Turning now to the operation of the headlamp system 10, high and low beam patterns may be generated by a single light source 30 without the use of mechanically movable components, such as a moving reflector, a moving filter, a moving lens, or electro-mechanically movable components (i.e., components which move in response to one or more electrical currents, voltages, field strengths, or to changes in magnitude thereof, or components which move in response to one or more magnetic fluxes or field strengths, or to changes in magnitude thereof). It should be appreciated that moving or movable components include components which may in some degree experience displacement within a Cartesian coordinate system (x, y, z) relative to the headlamp module or the housing 20, generally. A first set of light emitters 31 may be actuated simultaneously (or nearly so) in order to generate a low beam. Similarly, a second set of light emitters 31 may be actuated simultaneously (or nearly so) in order to generate a high beam. Some of the light emitters 31 in the second set also may be in the first set and vice-versa; however, the sets will not be identical or will not involve LEDs illuminated at the same brightness levels. In addition, the processor 34 may vary the light intensity from any single LED on the multi-chip LED—e.g., to produce beam patterns of differing intensity and shape. Variations in brightness or intensity may be accomplished using PWM, e.g., the processor may control the current through one or more selected LEDs. Of course, this is merely one embodiment and other ways of controlling the brightness of individual LEDs will be appreciated by skilled artisans.

Figure 8:
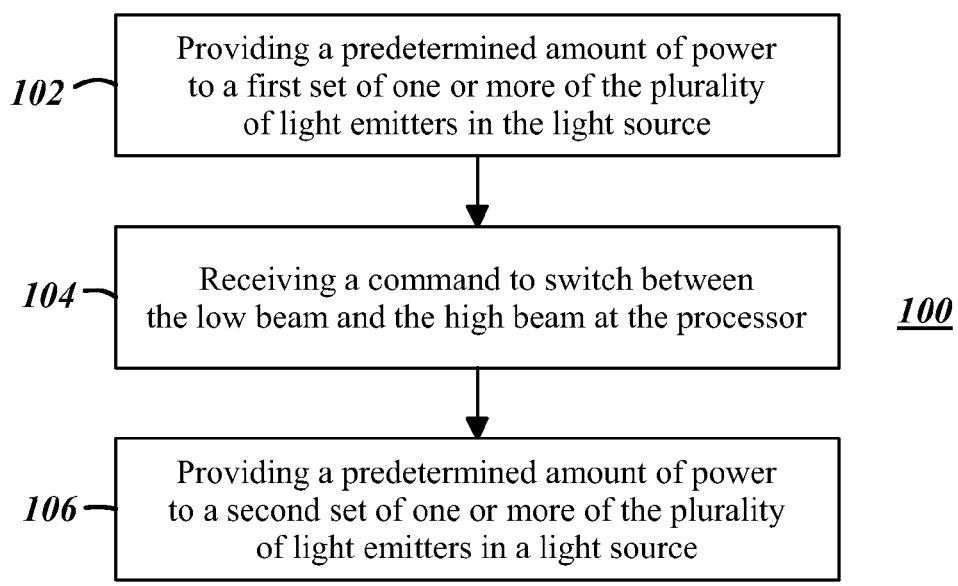
FIG. 8 is a flowchart depicting an embodiment of a method associated with a vehicle headlamp.

FIG. 8 illustrates an exemplary method 100 of switching between the low beam and the high beam without mechanically movable components. As used herein, the phrase without mechanically movable components will be understood to mean that once the headlamp module and its components are installed, no mechanical movement will contribute to the operation or actuation of the headlight or beam and its shifts and/or deviations from origin, whether these operations and actuations include high beam to low beam, low beam to high beam, angular shifts to the right or left, or any other movement of the beam or its measureable intensity at its hot spot or elsewhere. FIG. 8 illustrates a first step 102 of providing a predetermined amount of power to a first set of one or more of the plurality of light emitters in the light source. Next in step 104, a command is received to switch between the low beam and the high beam at the processor. And finally, in step 106, a predetermined amount of power is provided to a second set of one or more of the plurality of light emitters in the light source. While the second set may include some or all of the light emitters in the first set, one or more light emitters in the first set is different from those in the second set or is operated at a different brightness level, and vice-versa.

Figure 7:
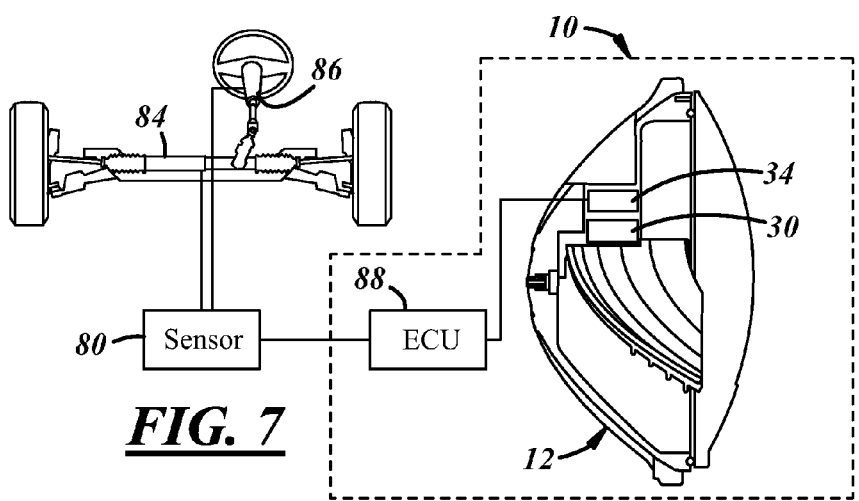
FIG. 7 is an electrical architecture diagram of a vehicle headlamp system.

Now turning to FIG. 7 which illustrates another implementation which may enable the center of the high or low beam pattern to be deviated right or left as the vehicle turns right or left, respectively (e.g., enabling a vehicle driver to better see the region around a curve as she/he turns the vehicle). FIG. 7 shows an exemplary sensor or turning angle detector 80 coupled near a front vehicle axle having two wheels 82. For example, the sensor 80 may be coupled to the chassis 84 or steering device 86 (e.g., the steering column). One or more sensors 80 may detect an angular deviation in the vehicle wheel(s) and may be coupled to an electronic control unit (ECU) 88. The ECU 88 may be coupled to the processor 34 of the headlamp system 10. Thus, when the sensor 80 detects the wheel(s) turning to the right or left, it may communicate (or signal) this to the ECU 88 which in turn communicates with the processor 34 to angularly deviate or shift the beam pattern accordingly. Further, this angular shift may be operable in both the low and high beam modes. In one implementation, the sensor 80 may be configured to signal the ECU 88 only when the wheel(s) turn right or left a threshold or predetermined angular amount. In another embodiment, the angular shift of the headlights may occur to the right or left in an amount proportional to the angular turning of the wheel(s). For example, where the wheels 82 turn 10° to the left, the headlight (or beam) may deviate 10° the left. And if the wheels then continue to turn 15° to the left, the headlight may also deviate 15° to the left. It is to be understood that all deviations to the right or left of the headlights may be accomplished without mechanically movable components as earlier described. Thus, deviations in the beam pattern may be accomplished by actuating on and/or off various sets or combinations of light emitters 31.

In addition, the angular shift of the beam pattern may necessitate a third, fourth, fifth, sixth, etc. groupings or sets of light emitters 31. For example, where the initial state of the headlight is a low beam generated from a first set of LEDs, a third set of LEDs may be necessary to angularly shift the low beam pattern to the right and a fourth set may be required to angularly shift the low beam pattern to the left. Similarly, a fifth and sixth sets may be required to angularly shift the high beam pattern right and left.

In one embodiment, the high and low beam patterns of emitted light may meet Federal Motor Vehicle Safety Standard 108 (FMVSS 108) which defines the respective photometry requirements of standard high beam and standard low beams and is incorporated herein by reference in its entirety. It should be appreciated that since the version date or revision date of the specification or standard is not explicitly recited herein, the high low beam patterns of emitted light may meet the photometry requirements of FMVSS 108 as of the filing date of this application or as of the version date or revision date of any subsequent version or revision of FMVSS 108.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle headlamp module, comprising:
a housing carrying:
  a fixed light source located within an interior space of a housing, the light source having a plurality of light emitters which may be independently actuated ON or OFF to emit light;
  a fixed reflector having a plurality of facets located within the interior space of the housing and coupled thereto and positioned to receive light from the light source and directionally control the light, wherein each of the plurality of facets comprises at least one of: a flat region or a curved region, wherein the reflector is substantially responsible for redirecting light from the plurality of emitters;
  an at least partially transparent and lens-less window for transmission of the light redirected by the fixed reflector; and
  a processor,
    wherein the processor operates in a first mode to actuate a first set of one or more of the plurality of light emitters, the light emitter(s) of the first set being positioned relative to the facets of the reflector so as to provide a first beam pattern, wherein the first beam pattern is a low beam pattern, and
    wherein the processor operates in a second mode to actuate a second set of one or more of the plurality of light emitters, the light emitter(s) of the second set being positioned relative to the facets of the reflector so as to provide a second beam pattern, wherein the second beam pattern is a high beam pattern.

2. A vehicle headlamp module, comprising:
a light source located within an interior space of a housing, the light source having a plurality of light emitters which may be actuated ON or OFF;
a reflector having a plurality of facets located within the interior space of the housing and coupled thereto and positioned to receive light from the light source and directionally control the light; and
a processor,
  wherein the processor operates in a first mode to actuate a first set of one or more of the plurality of light emitters, the light emitter(s) of the first set being positioned relative to the facets of the reflector so as to provide a first beam pattern,
  wherein the processor operates in a second mode to actuate a second set of one or more of the plurality of light emitters, the light emitter(s) of the second set being positioned relative to the facets of the reflector so as to provide a second beam pattern,
  wherein the processor is coupled to an electronic control unit (ECU) within the vehicle, wherein the ECU is coupled to and receives input from one or more turning angle detectors,
  wherein when the ECU receives input indicating the at least one wheel is oriented to the right, the processor operates in a fourth mode to actuate a fourth set of one or more of the plurality of light emitters and the headlight is shifted to the right using the facets of the reflector, and
  wherein when the ECU receives input indicating the at least one wheel is oriented to the left, the processor operates in a fifth mode to actuate a fifth set of one or more of the plurality of light emitters and the headlight is shifted to the left using the facets of the reflector.

3. A method of switching between a low beam and a high beam of a vehicle headlamp module without mechanically movable components, comprising the steps of:
- providing a predetermined amount of power to a first set of one or more of the plurality of light emitters in a light source, wherein the light source is located in a vehicle headlamp module which comprises:
  - a housing;
  - the light source, wherein the light source is fixedly mounted within an interior space of the housing, wherein the light source comprises at least two sub-strate portions lying in different Cartesian planes, wherein each of the at least two substrate portions carry at least one of the plurality of light emitters; and
  - a reflector having a plurality of facets, wherein the reflector is fixedly mounted within an interior space of the housing, and wherein the reflector is oriented to receive light from the light source;
- receiving a command to switch between the low beam and the high beam at a processor, wherein the processor is electrically coupled to the light source; and then
- providing a predetermined amount of power to a second set of one or more of the plurality of light emitters in the light source.

4. A vehicle headlamp system, comprising:
- a headlamp module, comprising:
  - a light source located within an interior space of a housing, the light source having a plurality of light emitters which may be actuated ON or OFF, wherein the light emitters have a 3-D (three-dimensional) arrangement so that at least one of the light emitters is not in the same plane as at least one of the other light emitters; and
  - a reflector having a plurality of facets located within the interior space of the housing and coupled thereto and positioned to receive light from the light source and directionally control the light; and
  - a processor responsive to user input,
    - wherein the processor operates in a first mode to actuate a first set of one or more of the plurality of light emitters, the light emitter(s) of the first set being positioned relative to the facets of the reflector so as to provide a first beam pattern, and
    - wherein the processor operates in a second mode to actuate a second set of one or more of the plurality of light emitters, the light emitter(s) of the second set being positioned relative to the facets of the reflector so as to provide a second beam pattern.

5. The vehicle headlamp system as defined in claim 4, wherein the processor is located within the headlamp module.

6. The vehicle headlamp system as defined in claim 4, wherein the headlamp is a sealed beam headlamp module.

7. The vehicle headlamp system as defined in claim 4, wherein the processor operates in a third mode to actuate a third set of one or more of the plurality of light emitters, the light emitted therefrom directionally located by the facets of the reflector to provide a third beam pattern, wherein any switching between the first, second, or third beam patterns does not require any mechanically movable parts.

8. The vehicle headlamp system as defined in claim 4, wherein the light emitters are LEDs, wherein the light source includes at least one multi-chip LED, at least one single-chip LED, or both.

9. The vehicle headlamp system as defined in claim 8, wherein the LEDs are arranged in two adjacent single row arrays on a two-dimensional substrate, wherein the arrangement includes a 12×1 array and a 5×1 array.

10. The vehicle headlamp system as defined in claim 8, wherein the LEDs are arranged in a arrangement of at least one of the following: a triangle-shaped, hexagonally-shaped, diamond-shaped, or quadrilaterally-shaped arrangement.

11. The vehicle headlamp system as defined in claim 4, wherein the vehicle headlamp is a lens-less LED headlamp.

12. The vehicle headlamp system as defined in claim 4, wherein the vehicle headlamp module does not require any mechanically or electro-mechanically movable parts to switch the first beam pattern to the second beam pattern, or vice-versa.

13. The vehicle headlamp system as defined in claim 4, wherein the processor alters the intensity of the beam patterns by controlling which of the plurality of light emitters are ON.

14. The vehicle headlamp system as defined in claim 4, wherein the processor alters the intensity of the beam patterns by managing the power to at least one light emitter using pulse-width modulation.

15. The vehicle headlamp system as defined in claim 4, wherein processor deviates the direction of the beam pattern to the right or left by controlling which of the plurality of light emitters are ON.

16. The vehicle headlamp system as defined in claim 4, wherein the reflector is formed to provide the first and second beam patterns in accordance with motor vehicle specification Federal Motor Vehicle Safety Standard 108 (FMVSS108), wherein the two beam patterns are each defined by light intensities at a finite set of points in a planar surface.

17. The vehicle headlamp system as defined in claim 4,
- wherein the processor is coupled to an electronic control unit (ECU) within the vehicle, wherein the ECU is coupled to and receives input from one or more turning angle detectors,
- wherein when the ECU receives input indicating the at least one wheel is oriented to the right, the processor operates in a fourth mode to actuate a fourth set of one or more of the plurality of light emitters and the headlight is shifted to the right using the facets of the reflector, and
- wherein when the ECU receives input indicating the at least one wheel is oriented to the left, the processor operates in a fifth mode to actuate a fifth set of one or more of the plurality of light emitters and the headlight is shifted to the left using the facets of the reflector.

* * * * *